(12) United States Patent
Butler

(10) Patent No.: US 11,754,508 B2
(45) Date of Patent: Sep. 12, 2023

(54) PORTABLE LIGHT SYSTEM FOR PERFORMING QUALITY CONTROL

(71) Applicant: William R. Butler, Pleasanton, CA (US)

(72) Inventor: William R. Butler, Pleasanton, CA (US)

( * ) Notice: Subject to any disclaimer, the term of this patent is extended or adjusted under 35 U.S.C. 154(b) by 0 days.

(21) Appl. No.: 18/010,390

(22) PCT Filed: May 13, 2022

(86) PCT No.: PCT/US2022/029199
§ 371 (c)(1),
(2) Date: Dec. 14, 2022

(87) PCT Pub. No.: WO2022/241220
PCT Pub. Date: Nov. 17, 2022

(65) Prior Publication Data
US 2023/0194436 A1    Jun. 22, 2023

Related U.S. Application Data

(60) Provisional application No. 63/188,383, filed on May 13, 2021.

(51) Int. Cl.
*G01N 21/88* (2006.01)

(52) U.S. Cl.
CPC ..... *G01N 21/8806* (2013.01); *G01N 21/8851* (2013.01); *G01N 2201/02* (2013.01); *G01N 2201/062* (2013.01)

(58) Field of Classification Search
CPC .......... G01N 21/8806; G01N 21/8851; G01N 2201/02; G01N 2201/062
See application file for complete search history.

(56) References Cited

U.S. PATENT DOCUMENTS

| 5,272,609 A | 12/1993 | Nelson |
| 8,599,097 B2 | 12/2013 | Intravatola |
| 8,816,599 B2 | 8/2014 | Wood et al. |
| 2013/0101090 A1 | 4/2013 | Schubert et al. |
| 2022/0067544 A1 | 3/2022 | Hu et al. |

FOREIGN PATENT DOCUMENTS

| CN | 104180188 | 12/2016 | |
| CN | 111551561 | 8/2020 | |
| CN | 111551561 A | * 8/2020 | .......... F16M 11/425 |
| JP | 2022007302 | 1/2022 | |

OTHER PUBLICATIONS

PCT/US2022/029199. International Search Report and Written Opinion dated Sep. 19, 2022, 63 pages.

* cited by examiner

*Primary Examiner* — Jamil Ahmed
(74) *Attorney, Agent, or Firm* — Cislo & Thomas, LLP

(57) ABSTRACT

A mobile surface inspection system having a base, at least one extendable arm coupled to the base, a hollow tubular member coupled to the base, and a processor, and a method of using the same. The base has at least one front leg, at least one back leg, and at least one wheel. The extendable arm has four extension members and there is a pivotable joint connected to the fourth extension member. A light fixture is removably connected to the pivotable joint. The processor is configured to receive an image of the surface when illuminated by the light fixture, apply a high-pass filter to the image, identify surface imperfections from the filtered image. and output a position for each of the surface imperfections.

20 Claims, 9 Drawing Sheets

PORTABLE LIGHT SYSTEM FOR PERFORMING QUALITY CONTROL

CROSS-REFERENCE TO RELATED APPLICATIONS

This United States Non-Provisional Patent Application is a national phase entry of and claims priority to PCT Application No. PCT/US2022/029199, titled "Portable System for Preparing Quality Control," filed May 13, 2022, which claims priority to U.S. Patent Application No. 63/188,383, titled "Portable Light System for Performing Quality Control," filed May 13, 2021, the contents of which are incorporated by reference herein in their entirety.

BACKGROUND

A significant portion of the construction in the United States use drywall as a finish material in both residential and commercial construction projects. The drywall must be affixed to studs or other material. The drywall comes is large sheets that are generally screwed to underlying studs. The joints between the sheets are then taped off and a drywall joint compound applied. This drywall joint compound is generally sanded down until the joints between sheets of drywall are undetectable. The finished wall is then painted. It not uncommon, however, for the drywall joint compound or the paint to produce small imperfections that are difficult to detect. As a result, construction crews must sometimes return to a job site to repair these imperfections once the owner has detected the imperfections. If the contractor does return to a jobsite to repair such imperfections, the contractor may have to locate the imperfections and then repair the imperfections, both of which require time and expense. There is therefore a need for a system and method for detecting these imperfections before the contractor has left the construction site.

The automotive industry also suffers from a similar problem when it comes to completing body work. High or low points in body panels can be difficult to detect and the cost to repair only increases if a technician has to revisit and revise the work.

SUMMARY

The present invention satisfied that need. The present invention is directed to a mobile surface inspection system comprising a base, at least one extendable arm coupled to the base, a hollow tubular member coupled to the base, and optionally, a processor.

The base has at least one front leg, at least one back leg, and at least one wheel coupled to one of the legs.

Optionally the base can have two front legs pivotably coupled to the base, each having a detent locking system, two back legs rigidly coupled to the base, and there can be four wheels, wherein each wheel is coupled to one of the legs. Each wheel can have a lock that can be engaged to prevent movement of the wheel.

The extendable arm comprises a hollow first extension member, a second extension member, a hollow third extension member, and fourth extension member. The first extension member is coupled to the base and has an open distal end. The second extension member is configured to nest inside the first extension member and to extend out of and retract into the open distal end of the first extension member. The third extension member has an open distal end, and the fourth extension member is configured to nest inside the third extension member and to extend out of and retract into the open distal end of the third extension member.

There can be a bracket coupled to a distal end of the second extension member, and the bracket can have an extension extending from a center portion of bracket to which the third extension member is coupled.

There is a pivotable joint connected to the fourth extension member and a light fixture removably connected to the pivotable joint. The light fixture can be configured to illuminate a surface from within three inches of the surface.

The hollow tubular member has a proximal end and a distal end, and the proximal end is coupled to the base. The tubular member can extend from the base substantially parallel to the first extension member.

The processor is configured to receive an image of the surface when illuminated by the light fixture, apply a high-pass filter to the image, identify surface imperfections from the filtered image, and output a position for each of the surface imperfections.

The system can further comprise a power cord coupled to the light fixture and extending down to the hollow tubular member, wherein the cord is configured to retract into and extend out of the open distal end of the hollow tubular member.

The system can have a crossbar coupled to and extending between the distal end of the first extension member and the distal end of the hollow tubular member.

There can be a handle coupled to the extendable arm bracket.

A method of using the mobile surface inspection system comprises the steps of providing the system, turning on the light fixture, placing the system in close proximity to a surface to be inspected, receiving an image of the surface on the processor, applying a high-pass filter to the image, identifying surface imperfections from the filtered image, and outputting a position for each of the surface imperfections.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
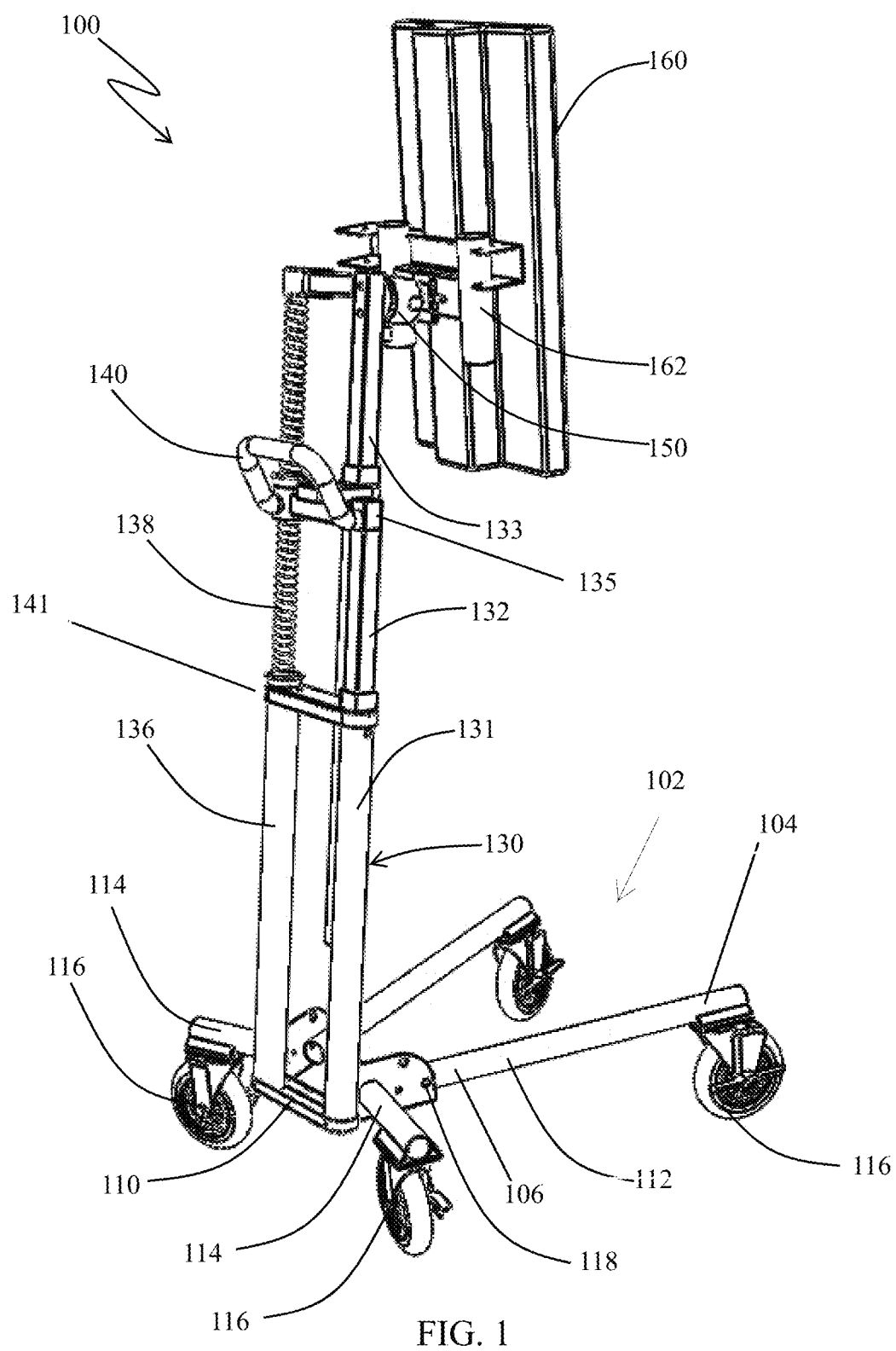
FIG. 1 is a perspective view of the mobile surface inspection system (MSIS) with telescopic arm extended, in accordance with a preferred embodiment of the present invention.
Figure 2:
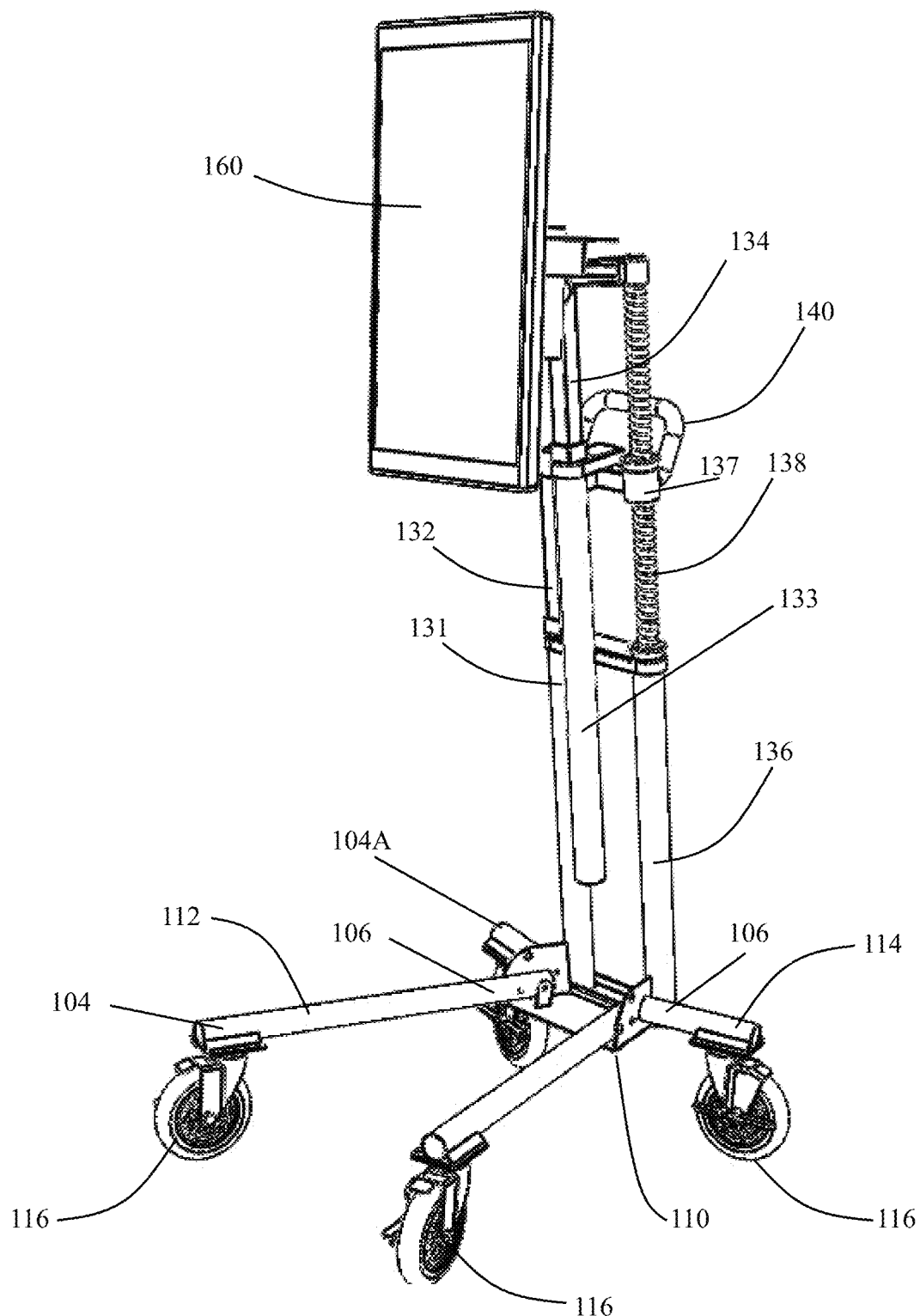
FIG. 2 is a perspective view of the mobile surface inspection system with telescopic arm extended, in accordance with a preferred embodiment of the present invention.

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

The terms "computer," "computer device," and "server" as used herein, refers to a device and/or system of devices that include at least one computer processing element, e.g., a central processing unit (CPU), and some form of computer memory having a capability to store data. The computer may comprise hardware, software, and firmware for receiving, storing, and/or processing data as described below. For example, a computer or computer device may comprise any of a wide range of digital electronic devices, including, but not limited to, a server, a desktop computer, a laptop, a smart phone, a tablet, or any form of electronic device capable of functioning as described herein.

The term "database" as used herein, refers to any form of one or more (or combination of) relational databases, object-oriented databases, hierarchical databases, network databases, non-relational (e.g. NoSQL) databases, document store databases, in-memory databases, programs, tables, files, lists, or any form of programming structure or structures that function to store data as described herein.

The term "computer memory" as used herein refers to any tangible, non-transitory storage that participates in providing instructions to a processor for execution. Such a medium may take many forms, including but not limited to, non-volatile media, volatile media, and any equivalent media known in the art. Non-volatile media includes, for example, ROM, magnetic media, and optical storage media. Volatile media includes, for example, DRAM, which typically serves as main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge, or any other medium from which a computer can read. While several examples are provided above, these examples are not meant to be limiting, but illustrative of several common examples, and any similar or equivalent devices or systems may be used that are known to those skilled in the art.

The term "processor" as used herein refers to a number of processing devices including personal computing devices, servers, general purpose computers, special purpose computers, application-specific integrated circuit (ASIC), and digital/analog circuits with discrete components, for example.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device or system disclosed in this disclosure will be determined by its intended use.

As illustrated in FIGS. 1-7, the invention in the preferred embodiment is a mobile surface inspection system (MSIS) 100 configured to assist with quality control on construction sites, home improvement projects, and automotive or autobody shops, for example. In particular, the MSIS 100 is configured to illuminate a wall or other surface in order to reveal surface imperfections or other irregularities in the surface. When the MSIS 100 is placed directly adjacent to a wall, for example, light from the MSIS 100 propagates nearly parallel to the surface of the wall. In the process, imperfections in the wall generally appear as either "hot spots" or "dark spots" depending on the nature of the imperfection. The imperfections can easily be identified and remedied in order to produce a more uniform, more pleasing surface. In cases in which the wall is newly painted, the imperfections may take the form of unpainted spots on the wall. Once revealed with light, the imperfections are identified, located, and logged for future repair by the user or other person.

The same concept applies to the automotive industry. When body work is performed on a vehicle, imperfections (such as low spots or high spots) in the body panels can be hard to detect. The MSIS 100 of the present invention can be used to quickly detect, log, and track these imperfections so that they may be rectified before the technician completes their work, avoiding the need for the technician to revisit the vehicle after the fact. The MSIS 100 can also prevent customer dissatisfaction, as the likelihood of a construction site, or a vehicle, being returned to the customer with imperfections can be reduced.

The MSIS 100 in the preferred embodiment includes a rolling base 102, at least one extendable arm 130, and pivotable light fixture 160. The rolling base 102 includes a rigid base plate 110, a plurality of leg members, and at least one wheel 116. The plurality of leg members include at least one front leg 112 and at least one back leg 114, but preferably two front legs 112 and two back legs 114. Each front leg 112 and each back leg 114 has a proximal end 104, 104A and a distal end 106, 106A, respectively. Optionally, the distal end 106A of the at least one back leg 114 is rigidly mounted to the base plate 110 while the distal end 106 of the at least one front leg 112 is rotatably connected to the base plate 110 by means of a hinge and detent locking system. In the preferred embodiment, the detent locking system for each leg 112 includes a spring-loaded pin 118 that secures the respective leg 112 in either a collapsed configuration or in an operation configuration. The operation configuration is shown in FIGS. 1-6. The collapsed configuration is shown in FIG. 7. To alternate between these configurations, the user need only depress the spring-loaded pin 118 to disengage the front leg 112 from the base plate 110, swing the front leg 112 to the new position, and allow the spring-loaded pin 118 to secure the front leg 112 in the new position. Optionally, the legs 112, 114 are removably coupled to the base plate 110 such that the MSIS 100 can be dissembled if necessary.

In the preferred embodiment, the front legs 112 are splayed outward, away from the base plate 110, such that proximal ends 104 of each of the front legs 112 are further away from each other than the distal ends 106 of the front legs 112. This configuration creates open space between the legs 112 and permits the MSIS 100 to maneuver around obstacles including portions of wall, furniture, and equipment, for example.

The wheels 116 in the preferred embodiment can be any type of wheel, but preferably are caster wheels. The wheels 116 may include locks 108 to prevent the wheels 116 from rolling and/or turning once positioned in a desired location. The locks 108 may be foot-operated for the convenience of the user.

The extendable arm 130 is a telescopic arm including at least two, preferably, four extension members 131, 132, 133, 134 that nest within one another, and each member has a proximal end and a distal end. The first and lowest extension member 131 is rigidly affixed to the base plate 110 via its proximal end and is hollow such that the distal end of the first extension member 131 is open and configured to receive the second extension member 132. The second extension member 132 nests within and extends out of the first extension member 131.

There is a bracket 135, having two opposed ends, where one end of the bracket 135 is coupled to the distal end of the second extension member 132, and the other end of the bracket 135 has an opening 137 therethrough. Positioned along a center of the bracket 135 is an extension 139 that extends from the bracket 135 and to which the third extension member 133 is coupled. The third extension member 133 is also hollow, where the distal end is open and configured to receive and retain the fourth extension member 134.

Optionally, the third extension member 133 is coupled directly to the second extension member 132.

The distal end of the fourth extension member 134 is coupled to the light fixture 160 via a ball joint 150. The ball joint 150 is configured to rotate the light fixture 160 in approximately 180 degrees in the horizontal plane and approximately 180 degrees in the vertical plane. As such, the light fixture 160 can be oriented in a wide variety of angles to accommodate any of a number of scenarios in the field. When properly oriented, the ball joint 150 is locked to prevent further movement.

In the preferred embodiment, the user raises the light fixture 160 to the desired height and then locks the extension members 131, 132, 133, 134 in place with threaded knobs. Each threaded knob is mounted in one extension member 131, 132, 133, 134 and then bears down on another extension member 131, 132, 133, 134 when rotated clockwise. The threaded knobs therefore create friction that prevents slippage of one extension member 131, 132, 133, 134 relative to one another. In the preferred embodiment, one threaded knob secures the first extension member 131 to the second extension member 132 while another threaded knob secures the third extension member 133 to the fourth extension member 134.

In the preferred embodiment, the extendable arm 130 has a maximum reach of approximately six feet, thereby positioning the light fixture 160 approximately six feet in the air. In other embodiments, the extendable arm 130 reaches approximately twelve feet in the air or higher.

The extendable arm 130 further includes an extension cord 138 for powering the light fixture 160. The extension cord 138, preferably a coiled cord, can easily elongate when the extendable arm 130 is fully deployed. When in the collapsed configuration however, the coiled cord 138 retracts into a hollow, tubular housing 136 running substantially parallel to the first extension member 131. The tubular housing 136 has two opposed ends, wherein the proximal end is rigidly coupled to the base plate 110, and the distal end is open and coupled to a crossbar 141. Crossbar 141 is also coupled to the first extension member 131. The cord 138 extends from the tubular housing 136, through the crossbar 141, through the opening 137 in the bracket 135, and up to the light fixture 160. This configuration is ideal because it prevents the cord 138 from having an opportunity to get tangled and ensures the cord 138 extends and retracts without issues.

The extendable arm 130 further includes a handle 140 and the handle 140 can be coupled to any of the extensions 131, 132, 133, 134, but preferably, the handle 140 is coupled, or an integral part of the bracket 135 as shown in the figures.

In the preferred embodiment, the light fixture 160 is a fluorescent light box with at least one bulb. In other embodiments, the light fixture 160 includes one or more incandescent light bulbs, halogen bulbs, or a plurality of light emitting diode (LED) light elements. In some embodiments, the plurality of LED light elements are configured to create substantially all colors in the RGB (red green blue) spectrum, thereby enabling the user to select a color that best reveals imperfections and/or missing spots of paint. The light fixture 160 is further characterized by an optical axis that is perpendicular to the face of the light fixture 160 or perpendicular to an aperture from which light is projected.

Figure 6:
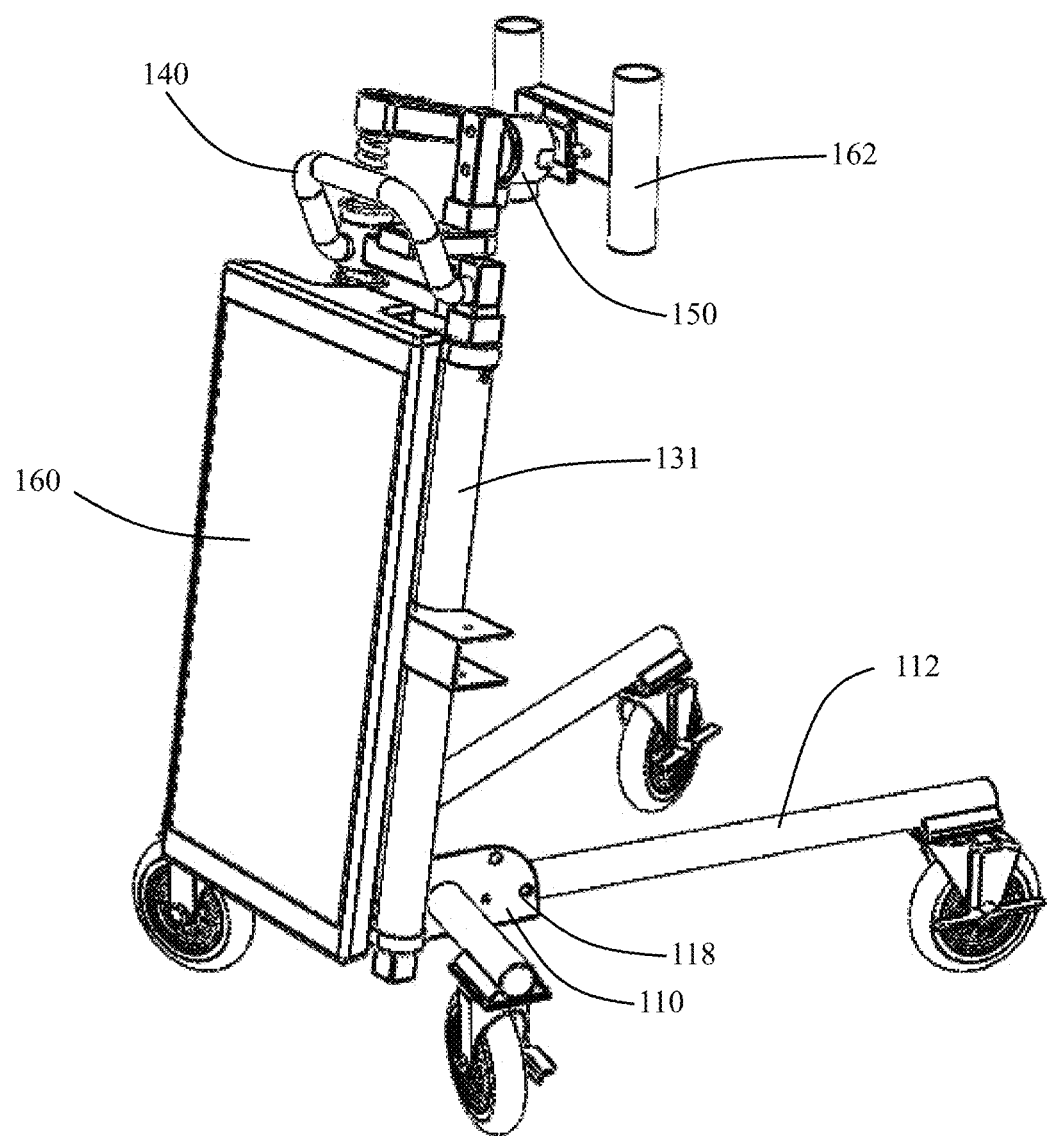
FIG. 6 is a perspective view of the mobile surface inspection system with the light fixture in stow configuration, in accordance with a preferred embodiment of the present invention.
Figure 7:
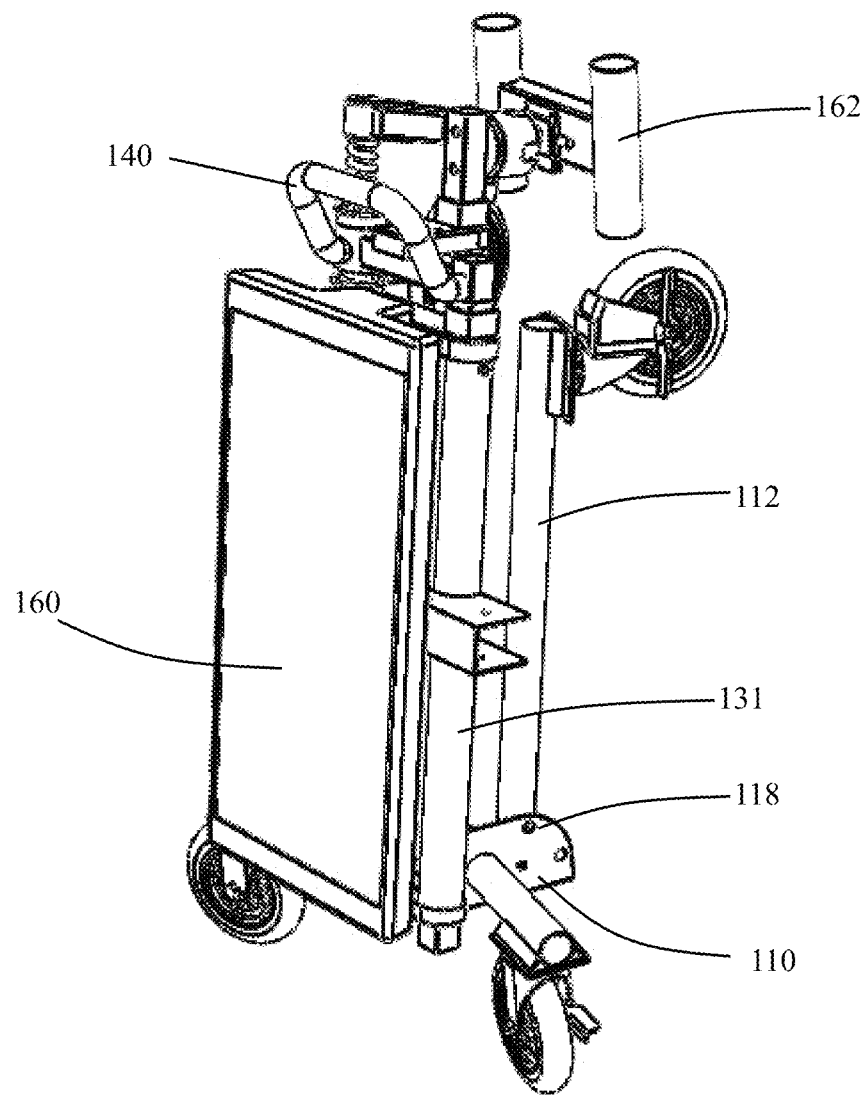
FIG. 7 is a perspective view of the mobile surface inspection system in the fully collapsed configuration, in accordance with a preferred embodiment of the present invention.

Referring now to FIGS. 6 and 7, the detachability of the light fixture 160 from the ball joint 150 is shown. In particular, the light fixture 160 includes a clamp 151 designed to latch onto a pair of tubes 162 affixed to the ball joint 150. When collapsing the MSIS 100, the clamp 151 is unlocked from the tubes 162 adjacent to the ball joint 150 and reattached to similar tubes in the extendable arm 130. In this position on the arm 130, the light fixture 160 can be transported safely with minimal risk of breakage to the light 160.

To perform a quality control procedure with respect to a wall, for example, the MSIS 100 is rolled close to the wall (or other surface to be examined) and the wheels 116 are locked. The extendable arm 130 is deployed until the light fixture 160 is roughly aligned with the vertical center of the wall, and the arm then locked in place. The light fixture 160 is positioned within several inches of the wall and the optical axis set approximately normal to the wall.

In this configuration, the light from the light fixture 160 propagates outward roughly parallel to the wall. While light propagates away from the fixture 160 and impinges on a large portion of wall, the intensity of light falls off in a gradient pattern as a function of distance from the light fixture 160. When the light impinges on an imperfection that protrudes from the wall, the protrusion captures more light than the surrounding area, thus resulting in a "hot spot". In addition, portions of wall are partially or fully shaded by the protrusion, thus making the imperfect easy to identify. In the cases of a recess or indent in the wall, light fails to illuminate the recess due the proximity of the light fixture 160 to the wall, thus yielding a shadow or "dark spot". Again, the recess imperfection is easy to identify. The MSIS 100 is used in a similar fashion in the automotive industry, where low spots or high spots can be identified along a body panel, for example.

Figure 3:
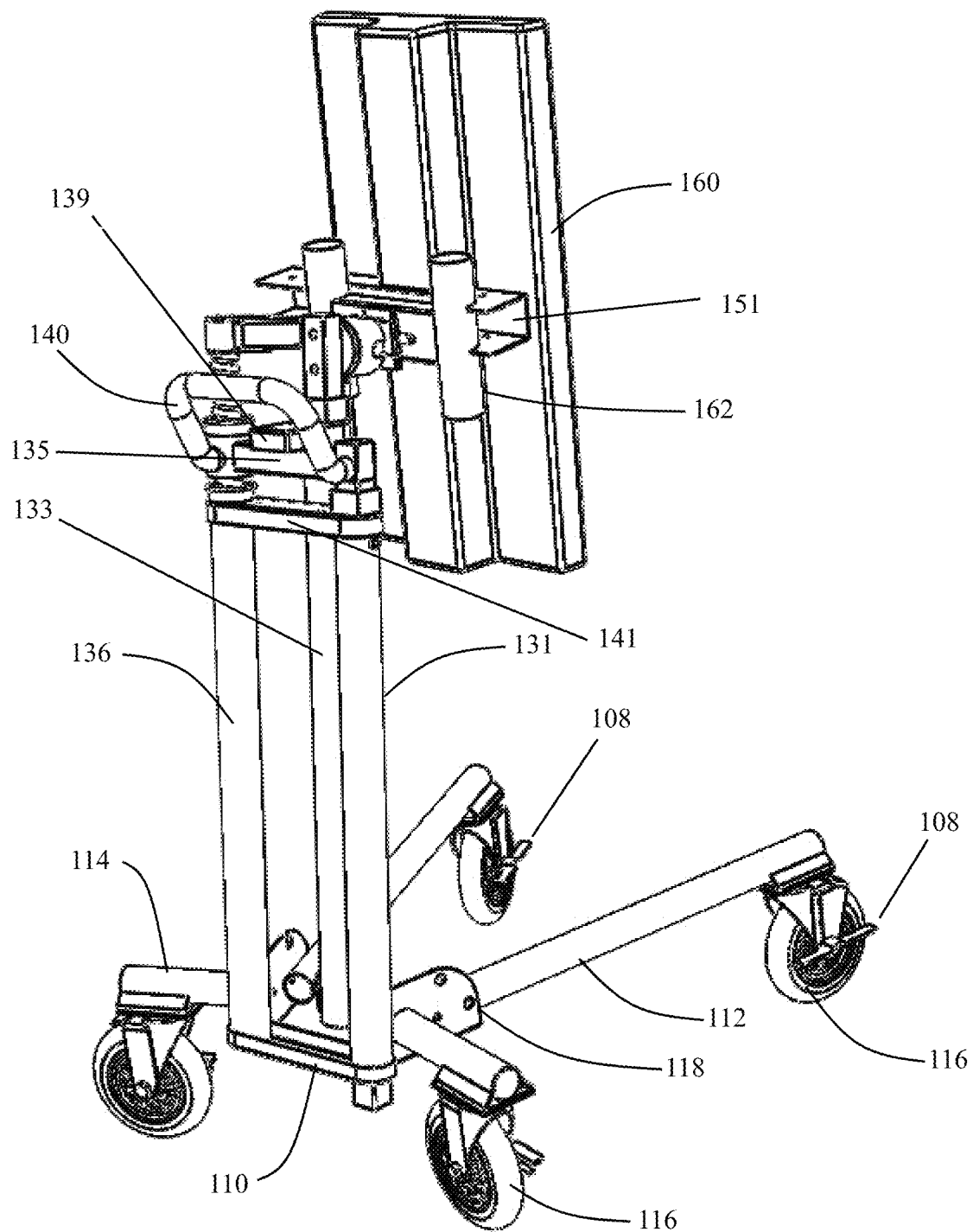
FIG. 3 is a perspective view of the mobile surface inspection system with telescopic arm retracted, in accordance with a preferred embodiment of the present invention.
Figure 4:
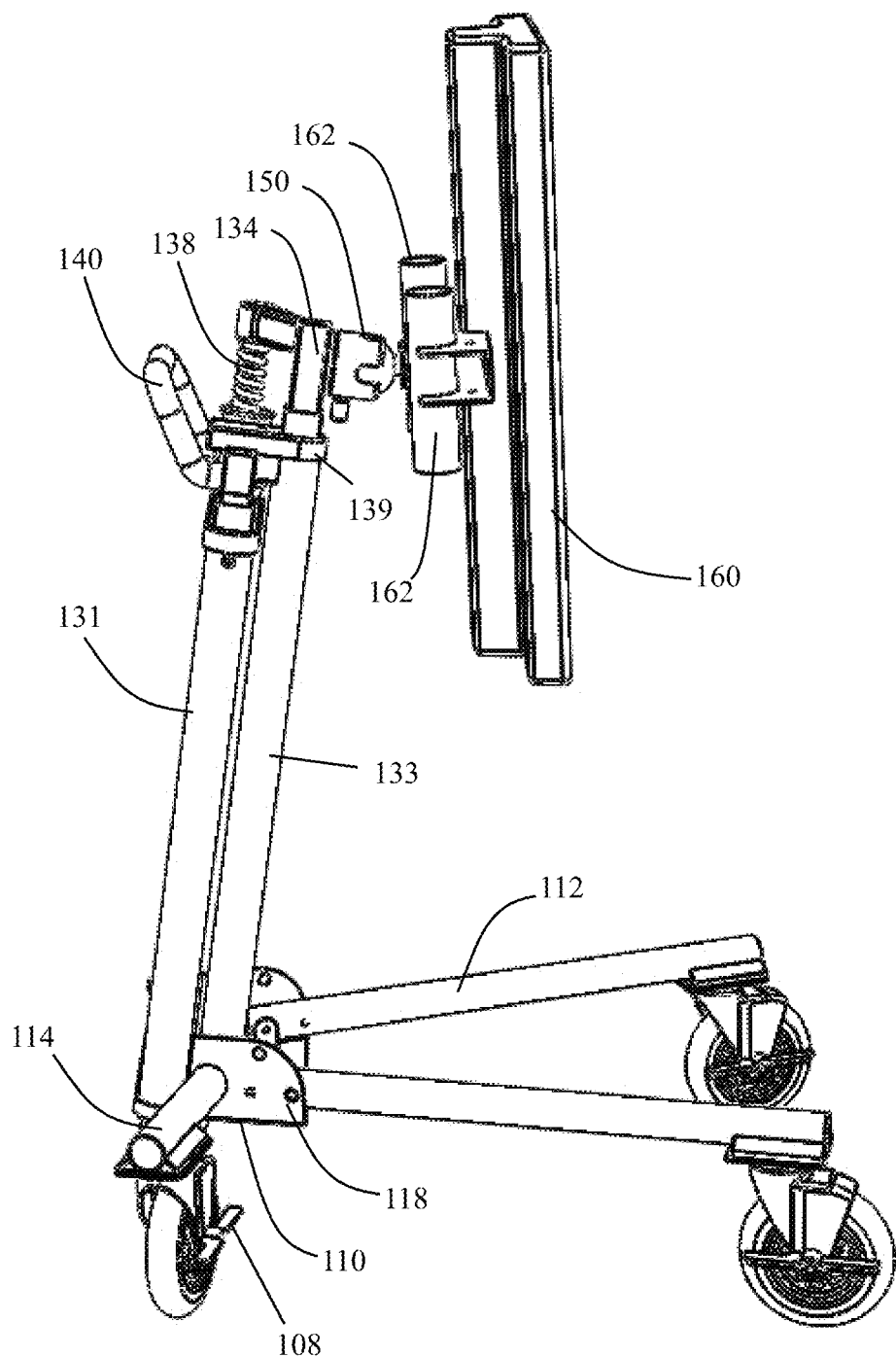
FIG. 4 is a perspective view of the mobile surface inspection system with telescopic arm retracted, in accordance with a preferred embodiment of the present invention.
Figure 5:
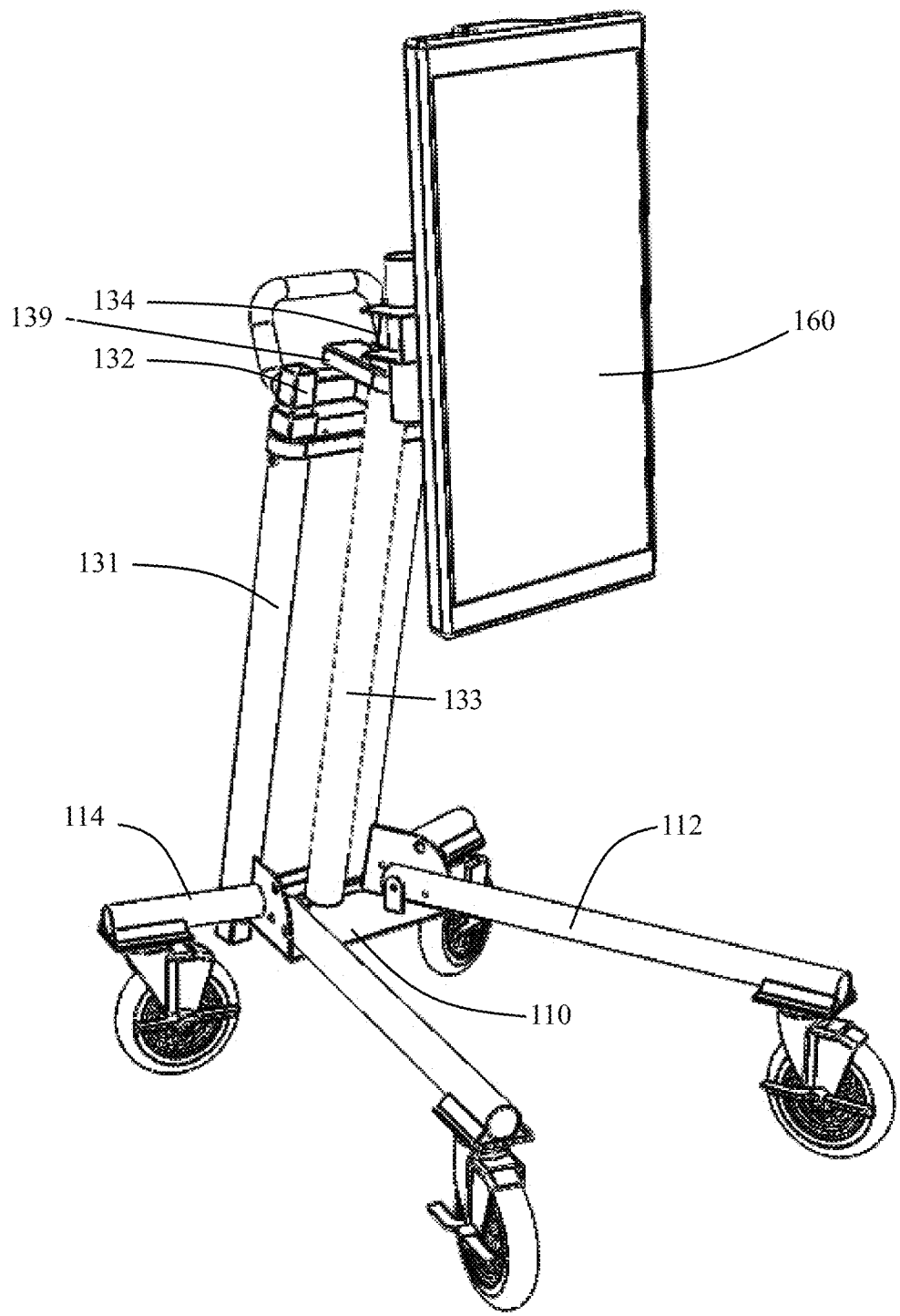
FIG. 5 is a perspective view of the mobile surface inspection system with telescopic arm retracted, in accordance with a preferred embodiment of the present invention.

When finished with a quality control procedure, the MSIS 100 is returned to its collapsed configuration so it may be rolled off the job site. To collapse the MSIS 100, the extendable arm 130 is collapsed down, as shown in FIGS. 3-5. The light fixture 160 is then removed from the ball joint 150 and mounted directly to the back side of the extendable arm 130, as shown in FIG. 6. Next, the front legs 112 are unlocked and folded upward against the extendable arm 130, as shown in FIG. 7. The user may then grasp the handle 140 and roll the MSIS 100 off the job site.

The system 100 and its components can be made from any material, including but not limited to metal, such as steel, aluminum, or titanium, among others, composite materials, fiber materials, plastic materials, or any other material that would be known to a person of ordinary skill in the art and would be reasonable to use.

Figure 8:
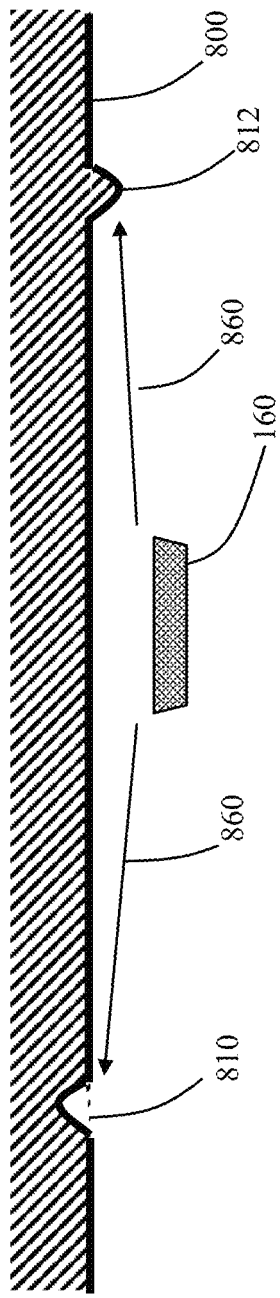
FIG. 8 is a cross section of a wall with surface imperfections, in accordance with a preferred embodiment of the present invention.
Figure 9:
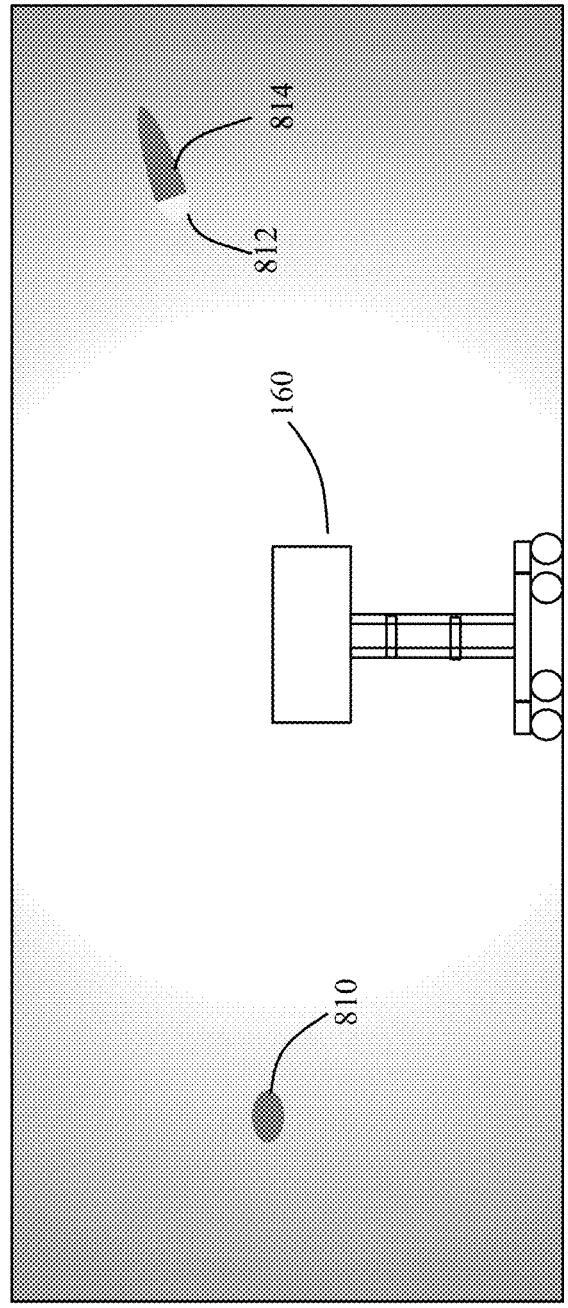
FIG. 9 is a side view of a wall with surface imperfections, in accordance with a preferred embodiment of the present invention.

Illustrated in cross section in FIG. 8 and in elevation view in FIG. 9 is the MSIS 100 illuminating a wall 180 with two surface imperfections including a recess 810 and a protrusion 812. As shown, with the light fixture 160 in close proximity to the wall, the resulting light pattern is in generally in the form of a gradient that tapers off in intensity with distance from the light fixture 160. Even with reduced intensity, however, the present invention 100 easily reveals imperfections. As shown, the angle of light 860 prevents the recess 810 from being illuminated, thus producing a noticeable shadow at the recess 810. The protrusion 812, in turn, is brightly illuminated on the side facing the light fixture 160 and dark 814 behind the protrusion 812 due to shadowing.

Figure 10:
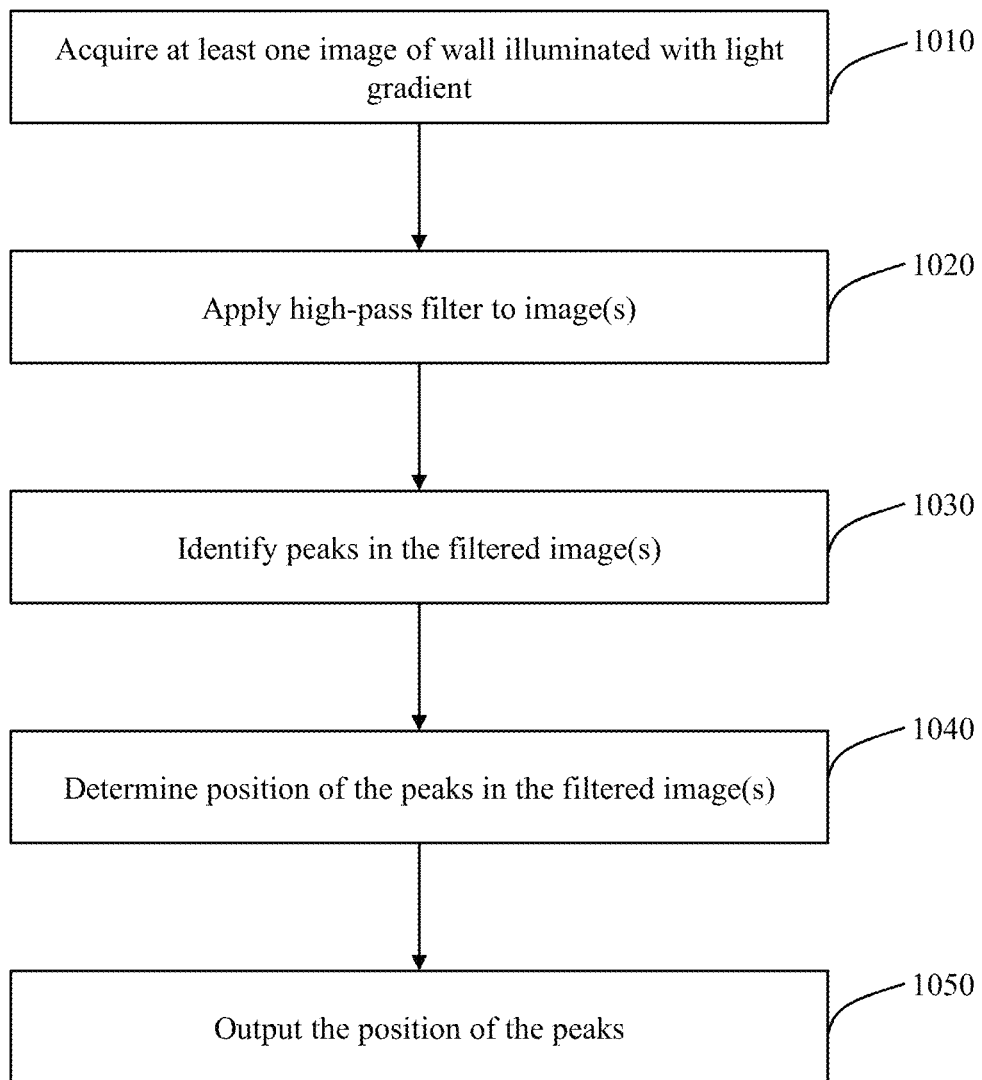
FIG. 10 is a flow chart of a process of identifying surface imperfections, in accordance with a preferred embodiment of the present invention.

In some embodiments, the invention 100 further includes a processor for analyzing one or more images of a wall or surface for imperfections using, for example, artificial intelligence or machine learning. As illustrated in the flowchart in FIG. 10, the processor is configured to acquire 1010 at least one image of the wall (or other surface to be examined) from a camera on a mobile phone device, for example. Additional images may be necessary where the wall (or other surface) is large or the camera's field of view is too narrow. The image must be acquired when the MSIS 100 is both close to the wall (or other surface to be examined) (for example, within several inches) and the light 160 is powered on. Optionally, the processor acquires 1010 a video of the surface. The processor then applies 8020 a high-pass filter or differential filter to the image/video. While the light 160 from the MSIS 100 produces a gradient pattern, the gradient is slowly varying and therefore suppressed by the high-pass filter operation. Imperfections, by contrast, are very localized and therefore persist after high-pass filtering.

The imperfections are then identified 8030 in the image/video and logged. Other structures—including light switches, plugs, doors, windows, shelves, vents, door handles, vehicle door handles, vehicle windows, vehicle side mirrors, etc.—can also be identified and omitted from the log of identified imperfections. The processor then determines 8040 the position of these imperfections from the filtered image(s)/video. The positions may be marked with a circle or an arrow, for example, on the original image/video of the wall/surface or by x-y coordinates with respect to the end of the wall/surface or some other feature in the image(s)/video. The positions of those imperfections are then outputted 8050 or otherwise reported to the user in the form of a list, e.g., a punch list, or report, either static or interactive. The user may then fix the imperfections or transmit the report to another person responsible for fixing the imperfections.

Optionally, the positions of the imperfections are outputted 8050 to an application on a mobile device, such a tablet, computer, laptop or mobile phone, that allows the user (or other person responsible for fixing the imperfections) to interact with and view the imperfections and indicate when each one has been addressed. The application then provides a report back to the user to notify them when the work has been completed. This also allows the user to check-in, in real time, to see what the status is of the work and determine how much has been completed and still needs to be completed.

Optionally, the processor and camera are integrated into the light fixture 160, coupled to the light fixture 160, or mounted on the extendable arm 130 proximate the light fixture 160.

Optionally, the user can use a device, mobile device or otherwise, that has LIDAR (light detection and ranging) capabilities, and that device can be used to detect the surface imperfections, which can then be tracked and logged from there.

As one skilled in the art will appreciate, having a list of imperfections and their location enables a person to easily locate and fix the imperfections even if the person was not present when the quality control operation was implemented. As such, a general contractor can use the MSIS system 100 to identify imperfections and then transmit that list of imperfections to the drywall and/or paint subcontractor. The subcontractor can then return to the job site, locate all the imperfections, and fix those imperfections all at once. Without the present invention, the subcontractor may fail to identify some imperfections and, therefore, need to make one or more additional visits to the job site to fix those additional imperfections. Using the present invention therefore ensures that all imperfections are repaired in the least amount of time with the least amount of cost/effort.

The same concept applies to the automotive industry. An automotive supervisor can use the MSIS system 100 to identify imperfections and then transmit that list of imperfections to the technician that is responsible for the work. The technician can then return to the vehicle, locate all the imperfections, and fix those imperfections all at once. Without the present invention, the technician and/or supervisor may fail to identify some imperfections and, therefore, need to have the customer return the vehicle in order to fix those additional imperfections that were missed. Using the present invention therefore ensures that all imperfections are repaired in the least amount of time with the least amount of cost/effort.

In some embodiments, the imperfections may be used to generate a quality metric that is then associated with a person, technician and/or contractor. That is, the number of imperfections discovered as well as the nature of the imperfections (depth or size) may be used to generate a rating for characterizing the proficiency of the person, technician and/or contractor performing the work. A highly qualified contractor, for example, may generate on average a small number of imperfections per lineal foot of wall while a less qualified contractor may generate a relatively large number of imperfections on average. This quality metric may then be published to help future customers to select a contractor, or the quality metric used to rank contractors available for hire.

The same concept applies to the automotive industry as well. A body shop can use the system 100 to track the performance of its technicians. If a technician is missing too many imperfections (and therefore results in unsatisfied customers that have to return their vehicle for additional corrective work at the cost of the body shop), their poor performance can be addressed. Similarly, an insurance company could use this system 100 to track the performance of the body shops that it uses. A body shop that misses a higher amount of imperfections (and therefore results in unsatisfied customers that have to return their vehicle for additional corrective work) will be less desirable for an insurance company to use than a body shop that misses a lower amount of imperfections.

The system and method described above can take the form of an entirely hardware embodiment, an entirely software embodiment or an embodiment containing both hardware and software elements. In one embodiment, the system and method is implemented in software, which includes but is not limited to firmware, resident software, microcode, etc.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Described above, aspects of the present application are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. The internet can include a plurality of local area networks ("LANs") and a wide area network ("WAN") that are interconnected by routers. The routers are special purpose computers used to interface one LAN or WAN to another.

Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers and other related electronic devices can be remotely connected to either the LANs or the WAN via a digital communications device, modem and temporary telephone, or a wireless link. It will be appreciated that the internet comprises a vast number of such interconnected networks, computers, and routers.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HTML, or other markup languages, that are electronically stored at or dynamically generated by "WWW sites" or "Web sites" throughout the Internet. Additionally, client-side software programs that communicate over the Web using the TCP/IP protocol are part of the WWW, such as JAVA®x applets, instant messaging, e-mail, browser plug-ins, Macromedia Flash, chat and others. Other interactive hypertext environments may include proprietary environments such as those provided in America Online or other online service providers, as well as the "wireless Web" provided by various wireless networking providers, especially those in the cellular phone industry. It will be appreciated that the present application could apply in any such interactive communication environments, however, for purposes of discussion, the Web is used as an exemplary interactive hypertext environment with regard to the present application.

A web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a web site elsewhere on the Internet. Each hyperlink is assigned a URL that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer, is a software application program for providing a user interface to the WWW. Upon request from the remote access user via the web browser, the web browser requests the desired hypertext document from the appropriate web server using the URL for the document and the hypertext transport protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer.

Finally, the WWW browser may include optional software components, called plug-ins, that run specialized functionality within the browser.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

What is claimed is:

1. A mobile surface inspection system comprising:
   a) a base having:
      i) two front legs pivotably coupled to the base, each having a detent locking system;
      ii) two back legs rigidly coupled to the base; and
      iii) four wheels, wherein each wheel is coupled to one of the legs, each wheel having a lock that can be engaged to prevent movement of the wheel;
   b) at least one extendable arm coupled to the base, the arm comprising:
      i) a hollow first extension member rigidly coupled to the base and having an open distal end;
      ii) a second extension member configured to nest inside the first extension member and to extend out of and retract into the open distal end of the first extension member;
      iii) a bracket coupled to a distal end of the second extension member, the bracket having an extension extending from a center portion of bracket;
      iv) a third extension member coupled to the bracket extension, the third extension member being hollow and having an open distal end; and
      v) a fourth extension member configured to nest inside the third extension member and to extend out of and retract into the open distal end of the third extension member;
   c) a pivotable joint connected to the fourth extension member;
   d) a light fixture removably connected to the pivotable joint, wherein the light fixture is configured to illuminate a surface from within three inches of the surface;
   e) a hollow tubular member having a proximal end and a distal end, wherein the proximal end is coupled to the base and the tubular member extends from the base substantially parallel to the first extension member;
   f) a crossbar coupled to and extending between the distal end of the first extension member and the distal end of the hollow tubular member;
   g) a power cord coupled to the light fixture and extending down to the hollow tubular member, wherein the cord is configured to retract into and extend out of the open distal end of the hollow tubular member;
   h) a handle coupled to the extendable arm bracket; and
   i) a processor configured to:
      i) receive an image of the surface when illuminated by the light fixture;
      ii) apply a high-pass filter to the image;
      iii) identify surface imperfections from the filtered image; and
      iv) output a position for each of the surface imperfections.

2. A mobile surface inspection system comprising:
   a) a base having:
      i) two front legs pivotably coupled to the base;
      ii) two back legs rigidly coupled to the base; and
      iii) four wheels, wherein each wheel is coupled to one of the legs;
   b) at least one extendable arm coupled to the base, the arm comprising:
      i) a hollow first extension member rigidly coupled to the base and having an open distal end;
      ii) a second extension member configured to nest inside the first extension member and to extend out of and retract into the open distal end of the first extension member;
      iii) a third extension member being hollow and having an open distal end; and
      iv) a fourth extension member configured to nest inside the third extension member and to extend out of and retract into the open distal end of the third extension member;
   c) a pivotable joint connected to the fourth extension member;
   d) a light fixture removably connected to the pivotable joint;
   e) a hollow tubular member having a proximal end and a distal end, wherein the proximal end is coupled to the base;
   f) a power cord coupled to the light fixture and extending down to the hollow tubular member, wherein the cord is configured to retract into and extend out of the open distal end of the hollow tubular member; and
   g) a processor configured to:
      i) receive an image of the surface when illuminated by the light fixture;
      ii) apply a high-pass filter to the image;
      iii) identify surface imperfections from the filtered image; and
      iv) output a position for each of the surface imperfections.

3. The system of claim 2, wherein each front leg has a detent locking system.

4. The system of claim 2, wherein each wheel has a lock that can be engaged to prevent movement of the wheel.

5. The system of claim 2, wherein the extendable arm has a bracket coupled to a distal end of the second extension member, the bracket having an extension extending from a center portion of bracket to which the third extension member is coupled.

6. The system of claim 2, wherein the tubular member extends from the base substantially parallel to the first extension member.

7. The system of claim 2, further comprising a crossbar coupled and extending between the distal end of the first extension member and the distal end of the hollow tubular member.

8. The system of claim 2, further comprising a handle coupled to the extendable arm.

9. A mobile surface inspection system comprising:
   a) a base having:
      i) at least one front leg coupled to the base;
      ii) at least one back leg coupled to the base; and
      iii) at least one wheel coupled to one of the legs;
   b) at least one extendable arm coupled to the base, the arm comprising:
      i) a hollow first extension member coupled to the base and having an open distal end;
      ii) a second extension member configured to nest inside the first extension member and to extend out of and retract into the open distal end of the first extension member;

iii) a third extension member third extension member being hollow and having an open distal end; and
iv) a fourth extension member configured to nest inside the third extension member and to extend out of and retract into the open distal end of the third extension member;

c) a pivotable joint connected to the fourth extension member;

d) a light fixture removably connected to the pivotable joint; and e) a hollow tubular member having a proximal end and a distal end, wherein the proximal end is coupled to the base.

10. The system of claim 9, wherein each front leg has a detent locking system.

11. The system of claim 9, wherein each wheel has a lock that can be engaged to prevent movement of the wheel.

12. The system of claim 9, wherein the extendable arm has a bracket coupled to a distal end of the second extension member, the bracket having an extension extending from a center portion of bracket to which the third extension member is coupled.

13. The system of claim 9, wherein the tubular member extends from the base substantially parallel to the first extension member.

14. The system of claim 9, further comprising a crossbar coupled to and extending between the distal end of the first extension member and the distal end of the hollow tubular member.

15. The system of claim 9, further comprising a handle coupled to the extendable arm.

16. The system of claim 9, further comprising a power cord coupled to the light fixture and extending down to the hollow tubular member, wherein the cord is configured to retract into and extend out of the open distal end of the hollow tubular member.

17. The system of claim 9, further comprising a processor configured to:
a) receive an image of the surface when illuminated by the light fixture;
b) apply a high-pass filter to the image;
c) identify surface imperfections from the filtered image; and
d) output a position for each of the surface imperfections.

18. A method of using a mobile surface inspection system, the method comprising the steps of:
a) providing the system of claim 1;
b) turning on the light fixture;
c) placing the system in close proximity to a surface to be inspected;
d) receiving an image of the surface on the processor;
e) applying a high-pass filter to the image;
f) identifying surface imperfections from the filtered image; and
g) outputting a position for each of the surface imperfections.

19. A method of using a mobile surface inspection system, the method comprising the steps of:
a) providing the system of claim 2;
b) turning on the light fixture;
c) placing the system in close proximity to a surface to be inspected;
d) receiving an image of the surface on the processor;
e) applying a high-pass filter to the image;
f) identifying surface imperfections from the filtered image; and
g) outputting a position for each of the surface imperfections.

20. A method of using a mobile surface inspection system, the method comprising the steps of:
a) providing the system of claim 9;
b) turning on the light fixture;
c) placing the system in close proximity to a surface to be inspected;
d) receiving an image of the surface on the processor;
e) applying a high-pass filter to the image;
f) identifying surface imperfections from the filtered image; and
g) outputting a position for each of the surface imperfections.

* * * * *